Nov. 10, 1964  G. L. SCOTT  3,156,194
METHOD OF MAKING A COILED BREAD LOAF
Filed July 5, 1960  2 Sheets-Sheet 1

INVENTOR.
GERALD L. SCOTT
BY
Alfred R. Fuchs
ATTORNEY

Nov. 10, 1964   G. L. SCOTT   3,156,194
METHOD OF MAKING A COILED BREAD LOAF
Filed July 5, 1960   2 Sheets-Sheet 2

INVENTOR.
GERALD L. SCOTT
BY
Alfred R. Fuchs
ATTORNEY

United States Patent Office 3,156,194
Patented Nov. 10, 1964

3,156,194
METHOD OF MAKING A COILED BREAD LOAF
Gerald L. Scott, Kansas City, Mo., assignor to Interstate Bakeries Corporation, Kansas City, Mo., a corporation of Delaware
Filed July 5, 1960, Ser. No. 40,798
1 Claim. (Cl. 107—54)

My invention relates to a method of making a bread loaf, and more particularly to a method of making a coiled loaf.

In order to adapt the molding of a loaf of bread to machine molding methods, it has been customary for over fifty years to roll the rounded piece of dough, substantially of the same character as previously used in the method of molding bread by hand, into a sheet, and coiling the sheet up on itself into a scroll to form a molded loaf. In order that the layers of the scroll would be adhered together into a unitary mass to produce the loaf, the scroll thus formed has been for an equally long time compacted in some manner, as under a pressure board. The sheeting operation stretched the gluten lengthwise of the direction in which the dough was extended in forming the sheet and a loaf produced in this manner by what is ordinarily known as "straight molding," when sliced, has the slices extending crosswise of the scroll, which is lengthwise of the direction in which the sheet was extended, which not only stretched the gluten, but elongated the cells in the dough structure in the direction in which the sheeting operation was carried out. As a result, the slices would be cut parallel to the length of the elongated cells thus produced, causing the loaf to have a somewhat grayish appearance on the cut surface due to the elongated recesses in the face of the slices caused by the elongated cells. Also, due to the method in which the loaf was formed by coiling up the sheet on itself in the form of a scroll, a core was produced in the center of the loaf.

In order to overcome the objections to the machine molded loaves thus produced, it more recently became customary to coil the sheeted dough piece in a direction different from that in which it was sheeted, such as crosswise of the direction in which it was sheeted, which is commonly referred to as "cross molding." By doing this, the core was not eliminated, but the cut slice of the loaf had a lighter color due to the fact that more light was reflected therefrom because the cells produced were apparently smaller. This appearance of smaller cell structure was due to the fact that the cells that had been elongated during the sheeting operation were in such a position in the cross molded loaf of bread that the slice was cut crosswise through the same, producing a more rounded opening of the cell through the side face of the slice.

In an attempt to eliminate the core structure, or to at least place it in different positions in different portions of the loaf, and to extend it somewhat in the slice so that it would not be quite so noticeable, twisting of two dough pieces about each other to form a loaf, the dough pieces having been made by either the straight molding or cross molding method above referred to, has been resorted to. Such twisting is slow and expensive and gains some advantages in changing the position of the cells in the loaf and the core in the loaf, but the twisting of one dough piece against another causes pressure to be exerted on the sides of the dough pieces where these are in contact, which produces an undesirable hard or tough portion that is in the nature of a core, which extends lengthwise of the molded loaf and is present in every slice.

Thus it is at present customary to either produce a loaf by cross molding or by twisting two such straight molded or cross molded pieces together.

It is a purpose of my invention to produce a loaf of bread that has a silkier texture, a whiter crumb, which has a more desirable crust color, and will make better toast than bread made in the customary manner. As the caramelization of the crust creates the flavor in a bread loaf, my improved bread loaf made in accordance with my improved method of molding the same has a better flavor than is possible to obtain from the same dough by other bread molding methods. The flavor results from longer baking at lower temperature, permitted because my method produces a loaf with a closer knit cell structure than can be obtained by prior methods.

It is a further purpose of my invention to provide a method of molding a loaf of bread that produces such more closely knit cell structure and which, as a result of the more closely knit structure of the crust, prevents the internal moisture of the loaf from escaping, thus reducing the tendency of the loaf to dry out as compared with the loaf molded in the customary manner. Furthermore my method makes the addition of artificial softeners unnecessary because of the moisture retention qualities of the loaf. My molding method strengthens the dough due to the creation of torsion in the dough piece. The necessity of using high priced, high gluten content flours, ordinarily referred to as "strong" flours, to provide the necessary strength of the cell structure, is accordingly avoided by use of my molding method.

More particularly it is a purpose of my invention to mold a bread loaf by coiling a rod-like strand or length of dough of approximately uniform cross section into a helicoid having the turns thereof axially adjoining and the adjoining turns of approximately the same external diameter and of substantially zero internal diameter. The rod-like piece of dough may be of a defined or an indefinite length and may be produced in any desired manner, although it preferably is produced by first molding a dough piece into a loaf in the customary manner and thereafter elongating and stretching the molded dough piece lengthwise of itself to form the rod-like strand, which is then coiled up spirally or helically about an axis extending lengthwise of the resulting dough piece beginning with one end of the strand, and with the turns of the helicoidal member produced by such coiling being axially in contact with each other and with the inner portions of each turn in close engagement so that there is substantially no opening or passage through the resulting coil.

In stretching the dough piece the cells that are in the dough piece are elongated and their axes oriented in the direction of length of the rod-like elongated dough strand produced by the stretching action. Also the gluten is stretched lengthwise of the dough piece. The coiling of the rod-like dough strand into the helicoidal form above referred to, places the turns of the coiled dough piece from which the loaf is formed at an oblique angle to the length of the loaf with the elongated cells lying on their sides. As a result, when the bread is sliced the cells, as seen on the faces of the slice are shallow and elliptical in cross section, rather than round and deep, as in conventionally molded loaves, which produces the advantages of silkier texture, brighter crumb and better crust color of the baked loaf, and better color of the toast produced from bread molded according to my method.

The dough from which such a coiled bread loaf is produced is preferably more pliable than the dough for bread molded in a conventional manner, and thus higher water absorption is possible and desirable for the dough from which such coiled bread is made.

As the coiling of the dough piece strengthens the dough, it not only results in stronger side walls of the bread loaf, but due to the stronger cell structure, a loaf of lighter, softer crumb structure, than would otherwise be possible, can be produced.

Other objects and advantages of my invention will appear as the description of the drawings proceeds. I desire to have it understood, however, that I do not intend to limit myself to the particular details shown or described, except as defined by the claim.

Figure 1:
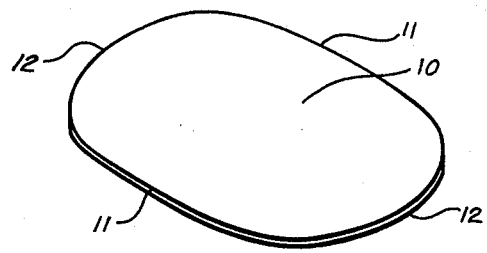
FIG. 1 is a somewhat diagrammatic view in perspective of the dough sheet from which the loaf is made.
Figure 3:
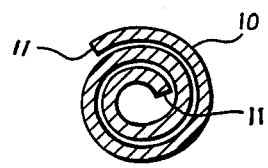
FIG. 3 is a section taken on the line 3—3 of FIG. 2.
Figure 4:
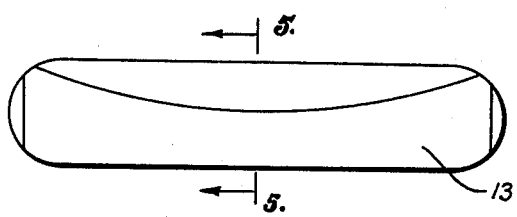
FIG. 4 is a view similar to FIG. 2 of the dough piece after it has been compacted and is ready for extension lengthwise.

Referring in detail to the drawings, while the rod-like strand of dough shown in FIG. 4 can be produced in any desired manner, the dough strand is preferably formed from a molded dough piece that is made from a rounded piece or ball of dough that has been sheeted by the usual sheeting mechanism of a bread molding machine, or which can be rolled out into a sheet in any other desired manner. Such a dough sheet is shown at 10 in FIG. 1, and it is ordinarily provided with slightly curved side edges 11 and somewhat more sharply rounded ends 12 due to the fact that it is sheeted or rolled out in the direction of length of the completed sheet. The next step in forming the loaf preferably is to curl up the sheeted dough piece 10 on itself in the form of a scroll, shown in FIGS. 2 and 3, with the one side edge 11 innermost and the other side edge 11 outermost, the ends of the loaf being formed by the end edges 12, or in other words, the loaf is coiled transversely or substantially transversely to the direction in which the sheet has been extended in the sheeting operation.

Figure 2:
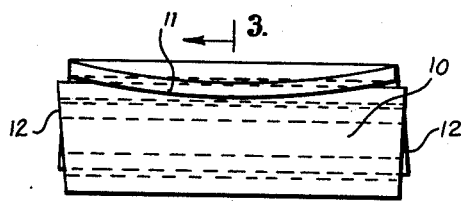
FIG. 2 is a side elevation of the curled up dough sheet prior to compacting.
Figure 5:
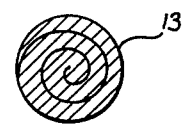
FIG. 5 is a section taken on the line 5—5 of FIG. 4.
Figure 6:
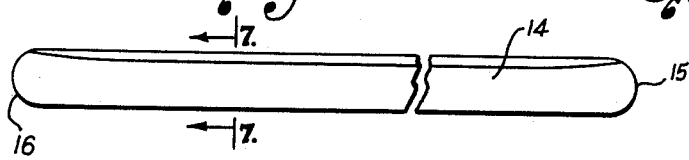
FIG. 6 is a side elevation, partly broken away, of the dough piece after it has been stretched into an elongated rod-like dough strand.
Figure 7:
FIG. 7 is a section taken on the line 7—7 of FIG. 6.

The somewhat loose scroll shown in FIGS. 2 and 3 is next compacted in any desired manner, as by passage under a pressure board, or manually, if so desired, into the conventional loaf-like piece 13, shown in FIGS. 4 and 5, the length thereof being somewhat increased by the compacting operation and the amount of compacting being variable so as to obtain a desired length for the dough piece prior to the next step in the method of molding the coiled loaf. The dough piece 13 is next extended into a rod-like strand 14 by stretching the dough piece lengthwise of itself to, preferably, several times the length of the piece 13 either by pulling thereon lengthwise with the hands or by a suitable mechanism for this purpose, said strand having the ends 15 and 16.

Figure 8:
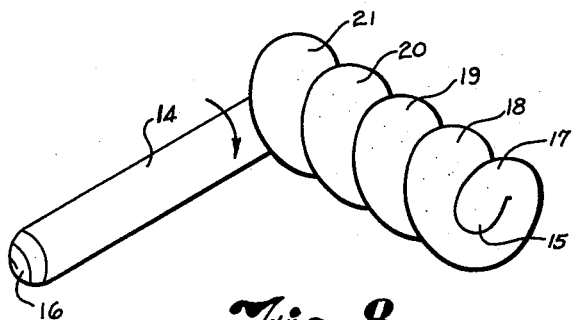
FIG. 8 is a somewhat diagrammatic view in perspective, showing the rod-like dough strand partly coiled into loaf form.

The strand 14 is then coiled up in the manner illustrated in FIG. 8 by starting with one end 15 of the strand and coiling the same helically on itself toward the end 16 of the strand. The coiling is done in such a manner that the turns 17, 18, 19, 20, 21 and 22 are arranged axially or lengthwise of the completed loaf, the side of the turn 18 next to the turn 17 being in contact therewith, and similarly, the turns 19, 20, 21 and 22 are in contact with the turns 18, 19, 20 and 21 on the side thereof adjacent said turns. Thus a dough loaf is formed that is of a helicoidal character and which has the turns thereof axially adjoining and the adjoining turns being approximately the same diameter. Furthermore, each turn is completely closed on the inner side thereof so that it is of zero internal diameter, thus preventing any hole or opening extending axially of the coiled dough loaf, the closed character of the turns being illustrated diagrammatically in FIGS. 8, 9 and 10. The dough loaf is the same in shape as that of a coil spring of zero internal diameter.

Figure 9:
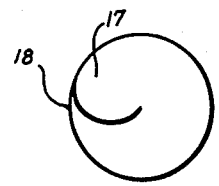
FIG. 9 is an end view thereof.
Figure 10:
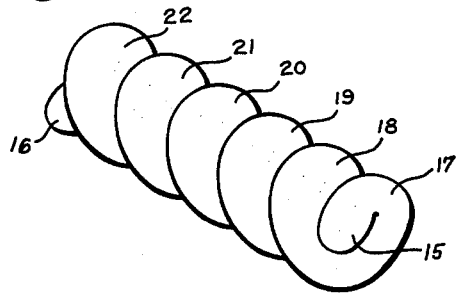
FIG. 10 is a perspective view of the completed coiled dough loaf.

The action of coiling the piece of dough up in the manner shown in FIGS. 8, 9 and 10 causes a torsional stress to be exerted on the dough strand 14 as it is being coiled up on itself, as indicated by the arrow in FIG. 8. It is this torsional stress created in the dough piece that strengthens the dough so that no high priced, high gluten content flours are required to strengthen the cell structure of the dough piece.

The final step of my improved method comprises the holding of the coiled up dough piece in its coiled up condition by means of the hands or a suitable mechanism for this purpose and transfer of the same to the pan in this condition. In forming the rod-like strand 14, it is highly desirable that it be formed so that it will be of substantially uniform diameter from the end 15 to the end 16 thereof so that the loaf will be of the same or substantially the same cross section from adjacent one end thereof to adjacent the other end thereof. The sheeting of the dough piece to form the loaf-like dough piece 13, from which the rod-like strand 14 is made, should be of normal thickness for the ordinary molded loaf made by conventional bread molding methods.

When the loaf molded in accordance with my invention is proofed and baked, it produces a finished loaf that has a coiled body portion that has the turns thereof axially adjoining, and which has an elongated cell structure in which the cells are positioned at an oblique angle to the axis of the loaf with the cells lying on their sides and which has a texture that is silkier, a crumb that is of higher luster and a more desirable crust color than is obtainable by conventional molding methods. Furthermore the use of high gluten content flours and of softeners is avoided and a loaf of better flavor and a more closely knit cell structure is produced, which is of a moister character and will stay moist and fresh longer than the conventionally molded loaf. The adjoining turns of the coiled up dough piece will unite to form a continuous body of leavened dough from end to end of the molded loaf, upon proofing the molded leaf, the top surface of the loaf, being out of contact with the pan, will have a series of slightly elevated rounded ridges extending at a slight oblique angle across the same, which will be retained in the baked loaf, producing a somewhat wavy top surface thereon, as shown in FIGS. 11 and 12.

Figures 11, 12:
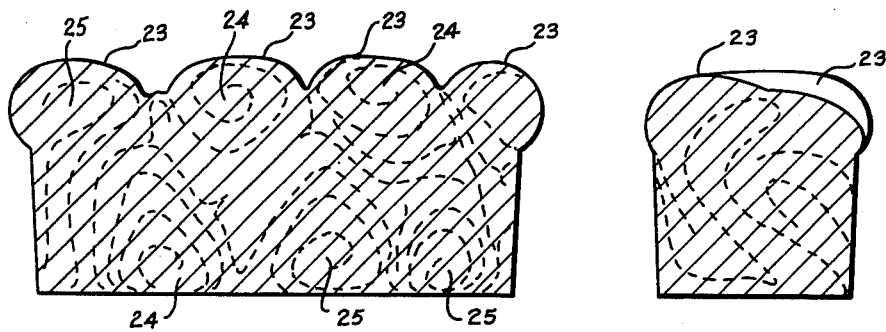
FIG. 11 is a transverse section through the baked loaf.
FIG. 12 is a longitudinal section therethrough.

In FIGS. 11 and 12 are shown, respectively, a cross section and a longitudinal section through the baked loaf of bread imposing thereon some dotted lines to show the manner in which the dough has been disposed in the loaf. The location of the dotted lines was determined by coating the dough sheet 10 and the dough strand 14 with a powder of contrasting color to the dough so that it would show up in a baked loaf to show the disposition of the dough in the baked loaf. This shows that the turns of the coil are located alternately at the top and bottom portions of the loaf, the end turns being somewhat modified by the engagement of the same with the walls of the pan. It will be obvious that the upper portion 24 of one turn is located at an angle of about 70 degrees to the lower portion of that turn, and it will be further noted that in the longitudinal section the spiral formation of the original scroll is still in evidence. However, upon examining the cross section shown in FIG. 11, it will be noted that the identity of the spiral curling of the dough piece into a scroll is substantially completely lost, and as a result the cores that would be in the middle of the portions 24 and 25, due to the spiral curling of the dough piece into a scroll, are stretched out and spread out in such a way that their presence in any slice is substantially unnoticeable. As will be obvious from the dotted lines in FIG. 11, there is none of the spiral formation, as such, evident in the bread slice, as is commonly the case with bread molded by the conventional methods hereinbefore discussed. The loaf shown in FIGS. 11 and and 12 was formed from a dough strand 14 approximately one inch in diameter and three feet long.

What I claim is:

In the method of molding a bread loaf, coiling a dough sheet crosswise of the direction in which it was sheeted into a scroll, compacting said scroll, axially extending said compacted scroll by axially stretching said scroll to form an elongated rod-like strand of approximately circular cross section throughout its length and several times the length of the compacted scroll, coiling said strand progressively from one end thereof to the other end thereof into a helicoid having axially abutting turns, all said turns being of approximately the same external diameter and of approximately zero internal diameter, and holding said coiled strand from uncoiling during transfer to a pan.

References Cited by the Examiner

UNITED STATES PATENTS

| | | | |
|---|---|---|---|
| 754,549 | 3/04 | Dietz | 99—86 |
| 1,812,769 | 6/31 | Binger | 99—86 |
| 2,000,384 | 5/35 | Frantz | 99—90 X |
| 2,178,959 | 11/39 | Freilich et al. | 99—90 |
| 2,234,525 | 3/41 | Guldbech | 107—9 X |
| 2,259,476 | 10/41 | MacManus | 99—86 |
| 2,613,620 | 10/52 | Allen | 107—54 |
| 2,730,051 | 1/56 | Hansen | 107—9 X |
| 2,827,378 | 3/58 | Glabe | 99—90 |
| 2,929,341 | 3/60 | Zoeller et al. | 107—54 |
| 2,953,107 | 9/60 | Marasso | 107—54 |
| 3,028,821 | 4/62 | Petersen | 107—8.6 X |
| 3,038,418 | 6/62 | Gugler | 107—4.3 X |

FOREIGN PATENTS

| | | |
|---|---|---|
| 519,453 | 3/40 | Great Britain. |
| 835,240 | 5/60 | Great Britain. |

ROBERT E. PULFREY, *Primary Examiner*.

T. E. LEVOW, A. H. WINKELSTEIN, C. A. WILLMUTH, *Examiners*.